United States Patent
Hasegawa et al.

(10) Patent No.: US 12,365,310 B2
(45) Date of Patent: Jul. 22, 2025

(54) SYSTEM, AND COMMUNICATION DEVICE

(71) Applicant: KABUSHIKI KAISHA TOKAI RIKA DENKI SEISAKUSHO, Aichi (JP)

(72) Inventors: Yosuke Hasegawa, Aichi (JP); Yosuke Ohashi, Aichi (JP)

(73) Assignee: KABUSHIKI KAISHA TOKAI RIKA DENKI SEISAKUSHO, Aichi (JP)

( * ) Notice: Subject to any disclaimer, the term of this patent is extended or adjusted under 35 U.S.C. 154(b) by 367 days.

(21) Appl. No.: 17/958,508

(22) Filed: Oct. 3, 2022

(65) Prior Publication Data

US 2023/0103620 A1 Apr. 6, 2023

(30) Foreign Application Priority Data

Oct. 4, 2021 (JP) .................. 2021-163293

(51) Int. Cl.
*B60R 25/24* (2013.01)
*B60R 25/01* (2013.01)
*H04W 64/00* (2009.01)

(52) U.S. Cl.
CPC ............. *B60R 25/24* (2013.01); *B60R 25/01* (2013.01); *H04W 64/003* (2013.01); *B60R 2325/101* (2013.01); *B60R 2325/205* (2013.01)

(58) Field of Classification Search
CPC ........ B60R 2325/101; B60R 2325/205; B60R 25/01; B60R 25/24; G01S 11/06; G01S 13/765; G01S 2205/01; G01S 5/0258; G01S 5/0284; H04W 4/80; H04W 64/003; H04W 84/18

USPC ....................................................... 455/456.1
See application file for complete search history.

(56) References Cited

U.S. PATENT DOCUMENTS

| | | | |
|---|---|---|---|
| 9,566,945 B2 | 2/2017 | Ghabra et al. | |
| 12,157,434 B2* | 12/2024 | Park | H04W 4/40 |
| 2014/0320262 A1* | 10/2014 | Park | G07C 9/00309 340/5.61 |
| 2019/0051072 A1* | 2/2019 | Okada | H04W 4/40 |
| 2022/0314934 A1* | 10/2022 | Smith | H01Q 21/30 |
| 2022/0371549 A1* | 11/2022 | Park | B60R 25/209 |
| 2023/0010267 A1* | 1/2023 | Kincaid | G07C 9/00309 |
| 2023/0071554 A1* | 3/2023 | Zhang | G07C 9/00309 |

* cited by examiner

*Primary Examiner* — Hirdepal Singh
(74) *Attorney, Agent, or Firm* — GREENBLUM & BERNSTEIN P.L.C.

(57) ABSTRACT

A system including: a first communication device and a second communication device, wherein the first communication device and the second communication device perform the wireless communication that conforms to first wireless communication standards, and, when one of the first communication device and the second communication device decides that information obtained by the wireless communication that conforms to the first wireless communication standards satisfies a predetermined condition, perform the wireless communication that conforms to second wireless communication standards for measuring a distance between the first communication device and the second communication device.

12 Claims, 3 Drawing Sheets

SYSTEM, AND COMMUNICATION DEVICE

CROSS REFERENCE TO RELATED APPLICATION(S)

This application is based upon and claims benefit of priority from Japanese Patent Application No. 2021-163293, filed on Oct. 4, 2021, the entire contents of which are incorporated herein by reference.

BACKGROUND

The present invention relates to a system, and a communication device.

In recent years, various technologies for measuring a distance between devices (that may be also referred to as distance measurement) have been developed. For example, following U.S. Pat. No. 9,566,945 A discloses a technology that performs distance measurement based on a signal propagation time.

SUMMARY

According to the technology disclosed in above U.S. Pat. No. 9,566,945 A, that a door handle has been operated triggers starting measuring a distance between in-vehicle equipment and a portable device, and permitting unlocking a door lock based on the measured distance. Hence, a user has had to wait for measurement of the distance between the in-vehicle equipment and the portable device to be finished after operating the door handle.

Accordingly, the present invention is made in view of the aforementioned issue, and an object of the present invention is to provide a mechanism that makes it possible to optimize a timing to measure a distance between devices.

To solve the above described problem, according to an aspect of the present invention, there is provided a system comprising: a first communication device configured to perform wireless communication that conforms to first wireless communication standards, and wireless communication that conforms to second wireless communication standards different from the first wireless communication standards; and a second communication device configured to perform wireless communication that conforms to the first wireless communication standards, and wireless communication that conforms to the second wireless communication standards, wherein the first communication device and the second communication device perform the wireless communication that conforms to the first wireless communication standards, and, when one of the first communication device and the second communication device decides that information obtained by the wireless communication that conforms to the first wireless communication standards satisfies a predetermined condition, perform the wireless communication that conforms to the second wireless communication standards for measuring a distance between the first communication device and the second communication device.

To solve the above described problem, according to another aspect of the present invention, there is provided a communication device comprising: a first wireless communication section configured to perform wireless communication that conforms to first wireless communication standards: a second wireless communication section configured to perform wireless communication that conforms to second wireless communication standards different from the first wireless communication standards; and a control section configured to control operations of the first wireless communication section and the second wireless communication section, wherein the control section controls the first wireless communication section to perform the wireless communication that conforms to the first wireless communication standards with another communication device, and when deciding that information obtained by the wireless communication that is performed by the first wireless communication section and conforms to the first wireless communication standards satisfies a predetermined condition, or when the first wireless communication section receives information indicating that it has been decided that the predetermined condition has been satisfied, controls the second wireless communication section to perform the wireless communication with the another communication device, the wireless communication conforming to the second wireless communication standards for measuring a distance between the communication device and the another communication device.

To solve the above described problem, according to another aspect of the present invention, there is provided a communication device comprising: a first wireless communication section configured to perform wireless communication that conforms to first wireless communication standards: a second wireless communication section configured to perform wireless communication that conforms to second wireless communication standards different from the first wireless communication standards; and a control section configured to control operations of the first wireless communication section and the second wireless communication section, wherein the control section controls the first wireless communication section to perform the wireless communication that conforms to the first wireless communication standards with another communication device, and when deciding that information obtained by the wireless communication that is performed by the first wireless communication section and conforms to the first wireless communication standards satisfies a predetermined condition, or when the first wireless communication section receives information for requesting starting the wireless communication that conforms to the second wireless communication standards for measuring a distance between the communication device and the another communication device, controls the second wireless communication section to perform the wireless communication with the another communication device, the wireless communication conforming to the second wireless communication standards for measuring a distance between the communication device and the another communication device.

To solve the above described problem, according to another aspect of the present invention, there is provided a communication method executed by a system that comprises a first communication device configured to perform wireless communication that conforms to first wireless communication standards, and wireless communication that conforms to second wireless communication standards different from the first wireless communication standards, and a second communication device configured to perform wireless communication that conforms to the first wireless communication standards, and wireless communication that conforms to the second wireless communication standards, the communication method comprising: at the first communication device and the second communication device, performing the wireless communication that conforms to the first wireless communication standards; at one of the first communication device and the second communication device, deciding that information obtained by the wireless communication that conforms to the first wireless communication standards satisfies a predetermined condition; and at the first communication device and the second communication device, performing the wireless communication that conforms to the second wireless communication standards for measuring a distance between the first communication device and the second communication device when one of the first communication device and the second communication device decides that the information obtained by the wireless communication that conforms to the first wireless communication standards satisfies the predetermined condition.

As described above, the present invention provides a mechanism that makes it possible to optimize a timing to measure a distance between devices.

DETAILED DESCRIPTION OF THE EMBODIMENT(S)

Figure 1:
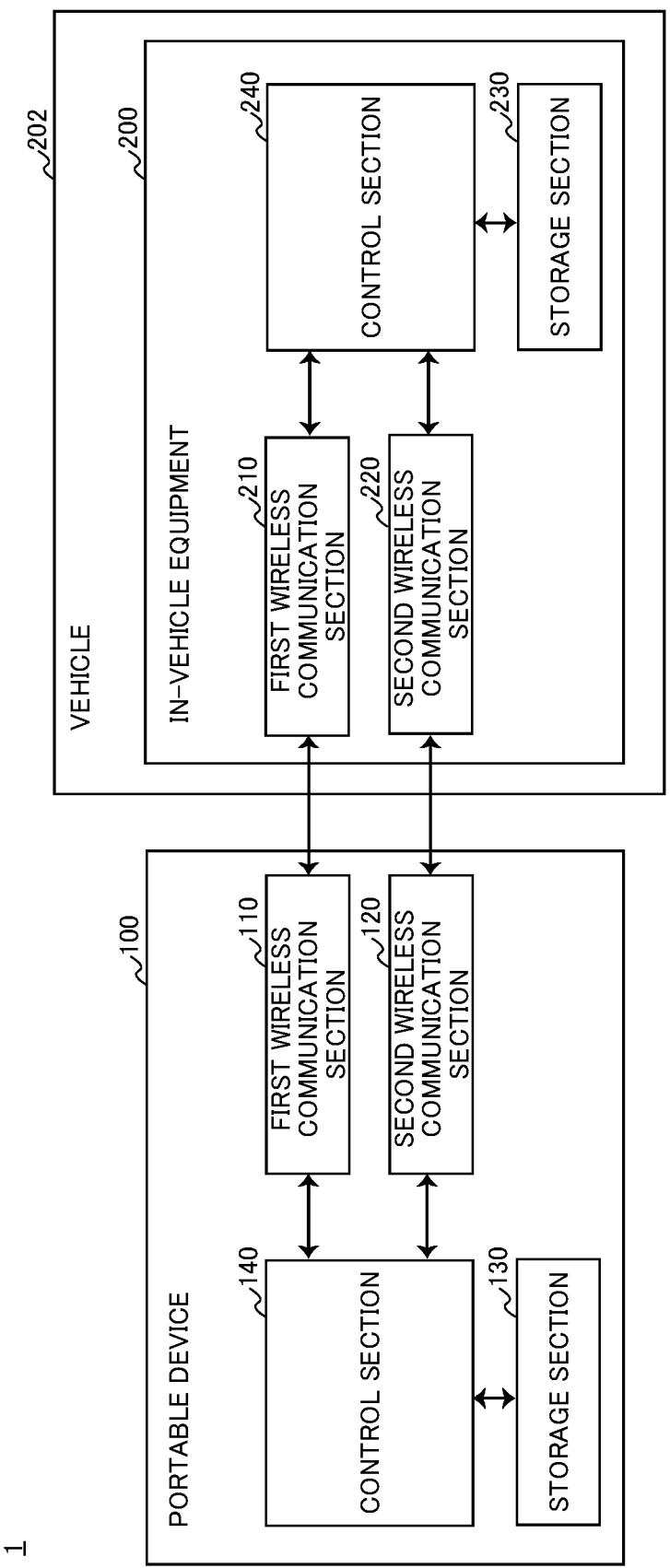
FIG. 1 is a diagram illustrating an example of a configuration of a system according to an embodiment of the present invention.

Hereinafter, referring to the appended drawings, preferred embodiments of the present invention will be described in detail. It should be noted that, in this specification and the appended drawings, structural elements that have substantially the same function and structure are denoted with the same reference numerals, and repeated explanation thereof is omitted.

1. Configuration Example

FIG. 1 is a diagram illustrating an example of a configuration of a system 1 according to an embodiment of the present invention. As illustrated in FIG. 1, the system 1 according to the present embodiment includes a portable device 100 and in-vehicle equipment 200. The in-vehicle equipment 200 is mounted on a vehicle 202. The vehicle 202 is an example of a use target of a user.

An authenticate side communication device and an authenticator side communication device are involved in the present invention. The portable device 100 is an example of the authenticate side communication device. The in-vehicle equipment 200 is an example of the authenticator side communication device.

According to the system 1, when, for example, the user (e.g., a driver of the vehicle 202) approaches the vehicle 202 carrying the portable device 100, the portable device 100 and the in-vehicle equipment 200 perform wireless communication for authentication. Furthermore, when the authentication succeeds, a door lock of the vehicle 202 is unlocked, an engine is started, and the vehicle 202 becomes available for the user. The system 1 is also referred to as a smart entry system.

Each component will be described below in order.
(1) Portable Device 100

The portable device 100 is a communication device that performs wireless communication with the in-vehicle equipment 200. The portable device 100 is an example of a first communication device according to the present embodiment. The portable device 100 is configured as an arbitrary device that the user carries to use. An example of the arbitrary device includes an electronic key, a smartphone, and a wearable terminal. As illustrated in FIG. 1, the portable device 100 includes a first wireless communication section 110, a second wireless communication section 120, a storage section 130, and a control section 140.

The first wireless communication section 110 has a function of performing communication that conforms to first wireless communication standards. For example, the first wireless communication section 110 performs wireless communication with the in-vehicle equipment 200. The second wireless communication section 120 has a function of performing communication that conforms to second wireless communication standards. For example, the second wireless communication section 120 performs wireless communication with the in-vehicle equipment 200.

The first wireless communication standards are near field wireless communication standards that enable wireless communication in a short distance. An example of the first wireless communication standards is Bluetooth Low Energy (BLE (registered trademark)). BLE is known as wireless communication standards of low power consumption. In addition, according to BLE, signals in a 2.4 GHz band are transmitted and received.

An example of the second wireless communication standards is wireless communication standards for transmitting and receiving signals that use an Ultra-Wide Band (UWB). By using an impulse system for wireless communication of a signal that uses the UWB, and using a radio wave of a very short pulse width equal to or less than nano seconds, it is possible to precisely measure a radio wave propagation time, and precisely perform distance measurement based on a propagation time. In addition, the UWB usually refers to a frequency band of approximately 3 GHz to approximately 10 GHz.

Hereinafter, it is assumed that the first wireless communication standards are BLE. That is, it is assumed that the first wireless communication section 110 is configured as a communication interface that can perform communication using BLE. Furthermore, it is assumed that the second wireless communication standards are wireless communication standards that use the UWB. That is, it is assumed that the second wireless communication section 120 is configured as a communication interface that can perform communication using the UWB.

The storage section 130 has a function of storing various pieces of information for the operations of the portable device 100. For example, the storage section 130 stores programs for the operations of the portable device 100, and an Identifier (ID), a password, and an authentication algorithm for authentication. The storage section 130 includes, for example, a storage medium such as a flash memory, and a processing device that executes recording and playback with respect to a storage medium.

The control section 140 has a function of controlling all operations of the portable device 100. For example, the control section 140 controls the first wireless communication section 110 and the second wireless communication section 120, and communicates with the in-vehicle equipment 200. Furthermore, the control section 140 reads information from the storage section 130, and writes information in the storage section 130. Furthermore, the control section 140 controls an authentication process performed together with the in-vehicle equipment 200. The control section 140 is configured as an electronic circuit such as a Central Processing Unit (CPU) and a microprocessor.

(2) In-Vehicle Equipment 200

The in-vehicle equipment 200 is a communication device that performs wireless communication with the portable device 100. The in-vehicle equipment 200 is an example of a second communication device according to the present embodiment. As illustrated in FIG. 1, the in-vehicle equipment 200 includes a first wireless communication section 210, a second wireless communication section 220, a storage section 230, and a control section 240.

The first wireless communication section 210 has a function of performing communication that conforms to BLE. For example, the first wireless communication section 210 performs wireless communication that uses BLE with the portable device 100. The first wireless communication section 210 is configured as a communication interface that can perform communication using BLE.

The second wireless communication section 220 has a function of performing communication that uses the UWB. For example, the second wireless communication section 220 performs wireless communication that uses the UWB with the portable device 100. The second wireless communication section 220 is configured as a communication interface that can perform communication using the UWB.

The storage section 230 has a function of storing various pieces of information for the operations of the in-vehicle equipment 200. For example, the storage section 230 stores programs for the operations of the in-vehicle equipment 200, and an authentication algorithm. The storage section 230 includes, for example, a storage medium such as a flash memory, and a processing device that executes recording and playback with respect to a storage medium.

The control section 240 has a function of controlling all operations of the in-vehicle equipment 200. In an example, the control section 240 controls the first wireless communication section 210 and the second wireless communication section 220, and communicates with the portable device 100. Furthermore, the control section 240 reads information from the storage section 230, and writes information in the storage section 230. The control section 240 functions as an authentication control section that controls an authentication process together with the portable device 100. Furthermore, the control section 240 functions as a door lock control section, too, that controls the door lock of the vehicle 202, and locks and unlocks the door lock. Furthermore, the control section 240 functions as an engine control section, too, that controls the engine of the vehicle 202, and starts/stops the engine. Note that a power supply equipped to the vehicle 202 may be, for example, a motor in addition to the engine. The control section 240 is configured as, for example, an Electronic Control Unit (ECU).

(3) Supplementary Explanation

The portable device 100 and the in-vehicle equipment 200 may conform to a specification specified in Car Connectivity Consortium (CCC) digital key release 3.0. This specification specifies that a vehicle and a mobile device that functions as a digital key perform wireless communication using Bluetooth Low Energy (BLE (registered trademark)) and the UWB to authenticate the mobile device.

<2. Technical Feature>

(1) Authentication That Uses BLE and UWB

The portable device 100 and the in-vehicle equipment 200 perform wireless communication that conforms to BLE. Above all, when being located within a range where wireless communication conforming to BLE can be performed, the portable device 100 and the in-vehicle equipment 200 perform the wireless communication that conforms to BLE. For example, one of the portable device 100 and the in-vehicle equipment 200 transmits a BLE advertisement. Furthermore, when succeeding in receiving the BLE advertisement, other one of the portable device 100 and the in-vehicle equipment 200 transmits a BLE connection request to an advertisement transmission source, and establishes BLE connection. Furthermore, the portable device 100 and the in-vehicle equipment 200 perform wireless communication via the established BLE connection.

In an example, the portable device 100 and the in-vehicle equipment 200 transmit and receive information for authentication of the portable device 100, and authenticates the portable device 100. An example of the information for authentication of the portable device 100 is an ID and a password of the portable device 100. Another example of the information for authentication of the portable device 100 is a challenge and a response. The challenge is data that is presented from an authenticator to an authenticate. The response is data that is generated based on the challenge and information (e.g., the ID and the password) of the authenticate.

The portable device 100 and the in-vehicle equipment 200 decide whether or not information obtained by wireless communication that conforms to BLE satisfies predetermined conditions (also referred to as approach decision conditions below). An example of the approach decision conditions is that a reception intensity (e.g., RSSI) of a signal transmitted by using BLE exceeds a predetermined threshold. That is, when the reception intensity at a time when the BLE signal transmitted by the other one of the portable device 100 and the in-vehicle equipment 200 exceeds the predetermined threshold, one of the portable device 100 and the in-vehicle equipment 200 decides that the approach decision conditions have been satisfied. The reception intensity corresponds to a distance between the portable device 100 and the in-vehicle equipment 200. In a case where, for example, the reception intensity is within a range of −90 dBm to −80 dBm, the distance between the portable device 100 and the in-vehicle equipment 200 is supposed to be approximately 10 m. Furthermore, in a case where the reception intensity is within a range of −80 dBm to −70 dBm, the distance between the portable device 100 and the in-vehicle equipment 200 is supposed to be approximately 5 m. Furthermore, in a case where the reception intensity exceeds −70 dBm, the distance between the portable device 100 and the in-vehicle equipment 200 is supposed to be less than 2 m. In a case where, for example, the reception intensity exceeds −70 dBm, that is, in a case where the portable device 100 and the in-vehicle equipment 200 approach each other at a distance less than 2 m, the portable device 100 and the in-vehicle equipment 200 decide that the approach decision conditions have been satisfied.

When one of the portable device 100 and the in-vehicle equipment 200 decides that the approach decision conditions have been satisfied, the portable device 100 and the in-vehicle equipment 200 perform wireless communication on a signal that uses the UWB for measuring a distance between the portable device 100 and the in-vehicle equipment 200. For example, the in-vehicle equipment 200 and the portable device 100 transmit and receive the signal that uses the UWB. Furthermore, the in-vehicle equipment 200 obtains a distance measurement value that is information indicating a distance between the portable device 100 and the in-vehicle equipment 200 based on a propagation time of the signal that uses the UWB. According to this configuration, when it is decided that the portable device 100 and the in-vehicle equipment 200 are located at a close distance, it is possible to perform distance measurement that uses the UWB whose distance measurement accuracy is higher.

The in-vehicle equipment 200 controls an operation of the vehicle 202 based on the information obtained by the wireless communication that uses the UWB. More specifically, the in-vehicle equipment 200 controls the operation of the vehicle 202 based on a distance measurement value that is the information obtained by the wireless communication that uses the UWB. When, for example, the distance measurement value is less than a predetermined distance, the in-vehicle equipment 200 unlocks the door lock of the vehicle 202, and starts the engine.

(2) Decision Subject of Approach Decision Conditions

Hereinafter, a case where a subject that has decided that the approach decision conditions have been satisfied is the portable device 100 will be described first.

When receiving a BLE signal from the in-vehicle equipment 200, the portable device 100 decides whether or not a reception intensity of the BLE signal satisfies the approach decision conditions. In an example, the portable device 100 may decide whether or not the approach decision conditions are satisfied every time the portable device 100 receives a BLE signal. In another example, the portable device 100 may decide whether or not the approach decision conditions are satisfied every time the portable device 100 receives BLE signals a plurality of times. In this case, the portable device 100 may decide whether or not a statistical value such as an average value or a median value of the reception intensities of the BLE signals received a plurality of times satisfy the approach decision conditions.

When deciding that the approach decision conditions have been satisfied, the portable device 100 transmits information indicating that the approach decision conditions have been satisfied. The portable device 100 may transmit a user approach notification "close" of user approach notifications that are messages specified in CCC digital key release 3.0 as the information indicating that it has been decided that the approach decision conditions have been satisfied. There are at least two types of user approach notifications including a user approach notification "far" and the user approach notification "close". The user approach notification "far" is a message that indicates that the portable device 100 and the in-vehicle equipment 200 do not approach each other, and is notified when, for example, the distance between the portable device 100 and the in-vehicle equipment 200 is far (e.g., 2 m or more). The user approach notification "close" is a message that indicates that the portable device 100 and the in-vehicle equipment 200 approach each other, and is notified when, for example, the distance between the portable device 100 and the in-vehicle equipment 200 is close (e.g., less than 2 m).

When receiving the information indicating that it has been decided that the approach decision conditions have been satisfied, the in-vehicle equipment 200 transmits information for requesting starting wireless communication that uses the UWB for measuring a distance between the portable device 100 and the in-vehicle equipment 200. The in-vehicle equipment 200 may transmit a distance measurement setup request that is a message specified in CCC digital key release 3.0 as the information for requesting starting the wireless communication that uses the UWB for measuring the distance between the portable device 100 and the in-vehicle equipment 200. The distance measurement setup request is a message for requesting preparing start of wireless communication that uses the UWB.

When receiving the information for requesting starting the wireless communication that uses the UWB for measuring the distance between the portable device 100 and the in-vehicle equipment 200, the portable device 100 transmits the information indicating that the wireless communication that uses the UWB for measuring the distance between the portable device 100 and the in-vehicle equipment 200 is started. The portable device 100 may transmit a distance measurement setup completion response that is a message specified in CCC digital key release 3.0 as the information indicating that the wireless communication that uses the UWB for measuring the distance between the portable device 100 and the in-vehicle equipment 200 is started. The distance measurement setup completion response is a message that indicates that preparation of start of wireless communication that uses the UWB has been completed.

When transmitting the information indicating that the wireless communication that uses the UWB for measuring the distance between the portable device 100 and the in-vehicle equipment 200 is started, the portable device 100 starts the wireless communication that uses the UWB. On the other hand, when receiving the information indicating that the wireless communication that uses the UWB for measuring the distance between the portable device 100 and the in-vehicle equipment 200 is started, the in-vehicle equipment 200 starts the wireless communication that uses the UWB. In this regard, starting the wireless communication that uses the UWB refers to one of transmitting a signal that uses the UWB and starting reception standby for the signal that uses the UWB.

The case where the subject that has decided that the approach decision conditions have been satisfied is the portable device 100 has been described above. Next, a case where the subject that has decided that the approach decision conditions have been satisfied is the in-vehicle equipment 200 will be described.

When receiving information indicating that the portable device 100 has decided that the approach decision conditions have not been satisfied, the in-vehicle equipment 200 decides whether or not the approach decision conditions are satisfied. When, for example, receiving the user approach notification "far" as the information indicating that the portable device 100 has decided that the approach decision conditions have not been satisfied, the in-vehicle equipment 200 may decide whether or not the approach decision conditions are satisfied.

When deciding that the approach decision conditions have been satisfied, the in-vehicle equipment 200 transmits the information for requesting starting the wireless communication that uses the UWB for measuring the distance between the portable device 100 and the in-vehicle equipment 200. The in-vehicle equipment 200 may transmit the distance measurement setup request as described above as the information for requesting starting the wireless communication that uses the UWB for measuring the distance between the portable device 100 and the in-vehicle equipment 200. Thus, similar to the case where the subject that has decided that the approach decision conditions have been satisfied is the portable device 100, the wireless communication that uses the UWB is started.

The case where the subject that has decided that the approach decision conditions have been satisfied is the in-vehicle equipment 200 has been described above.

As described above, even when the subject that decides that the approach decision conditions have been satisfied is the portable device 100 or the in-vehicle equipment 200, wireless communication that uses the UWB for distance measurement is started. Consequently, even when the portable device 100 has decided that the approach decision conditions have not been satisfied, the in-vehicle equipment 200 can decide whether or not the approach decision conditions are satisfied, and start wireless communication that uses the UWB for distance measurement. Consequently, it is possible to prevent the portable device 100 from causing a decrease in responsiveness of unlocking of the door lock and starting of the engine. For example, it is possible to achieve that an event that distance measurement that uses the UWB is not started due to wrong decision of the portable device 100 even when the user approaches the vehicle 202, and the user has to wait for the door to be unlocked more hardly occurs.

Above all, a decision timing of the approach decision conditions and the predetermined threshold of the approach decision conditions may differ per portable device 100. Factors of such a difference include a difference in a BLE communication interface, a difference in a version of installed software, and remaining battery power. Therefore, there is a case where the responsiveness of unlocking of the door lock and starting of the engine lowers depending on the portable device 100. In this regard, according to the present embodiment, not only the portable device 100 but also the in-vehicle equipment 200 decide whether or not the approach decision conditions are satisfied. Consequently, it is possible to prevent the portable device 100 from causing the decrease in the responsiveness of unlocking of the door lock and starting of the engine.

Note that, according to the above embodiment, only in a case where the portable device 100 has decided that the approach decision conditions have not been satisfied, the in-vehicle equipment 200 decides whether or not the approach decision conditions are satisfied. That is, the in-vehicle equipment 200 does not need to decide whether or not the approach decision conditions are satisfied every time the in-vehicle equipment 200 receives a BLE signal. Consequently, it is possible to reduce power consumption of the in-vehicle equipment 200.

(3) Flow of Process

Next, flows of processes will be described with reference to FIGS. 2 and 3.

Figure 2:
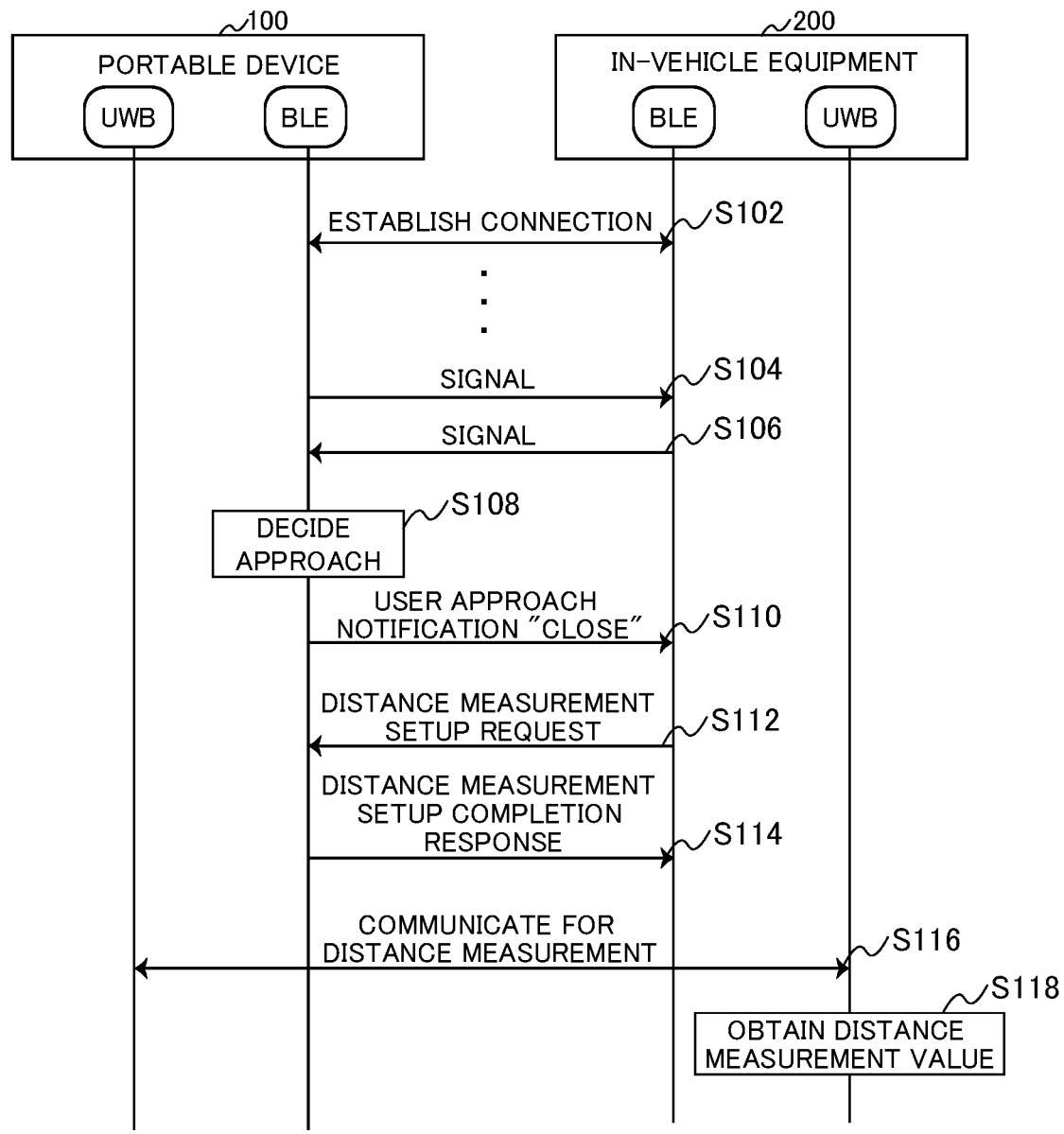
FIG. 2 is a sequence diagram illustrating an example of a flow of a process executed by the system according to the present embodiment.

FIG. 2 is a sequence diagram illustrating an example of the flow of the process executed by the system 1 according to the present embodiment. The portable device 100 and the in-vehicle equipment 200 are involved in this sequence. This sequence is an example where the subject that has decided that the approach decision conditions have been satisfied is the portable device 100.

As illustrated in FIG. 2, the portable device 100 and the in-vehicle equipment 200 first establish BLE connection (step S102). After establishing the BLE connection, the portable device 100 and the in-vehicle equipment 200 may transmit and receive information for authentication of the portable device 100 to authenticate the portable device 100. When succeeding in authenticating the portable device 100, the portable device 100 and the in-vehicle equipment 200 repeatedly transmit and receive BLE signals via the BLE connection (steps S104 and S106).

When receiving the BLE signal, the portable device 100 performs approach decision based on the received BLE signal (step S108). More specifically, the portable device 100 decides whether or not a reception intensity of the BLE signal exceeds the predetermined threshold, that is, whether or not the approach decision conditions are satisfied. It is assumed herein that it is decided that the reception intensity of the BLE signal exceeds the predetermined threshold, that is, the approach decision conditions are satisfied.

Next, the portable device 100 transmits the user approach notification "close" that indicates an approach decision result as information indicating that it has been decided that the approach decision conditions have been satisfied (step S110).

When receiving the user approach notification "close", the in-vehicle equipment 200 transmits the distance measurement setup request as the information for requesting starting wireless communication that uses the UWB for measuring a distance between the portable device 100 and the in-vehicle equipment 200 (step S112).

When receiving the distance measurement setup request, the portable device 100 transmits the distance measurement setup completion response as the information indicating that the wireless communication that uses the UWB for measuring the distance between the portable device 100 and the in-vehicle equipment 200 is started (step S114).

Next, the portable device 100 and the in-vehicle equipment 200 perform the wireless communication that uses the UWB for distance measurement (step S116). For example, the portable device 100 and the in-vehicle equipment 200 transmit and receive a UWB signal.

Furthermore, the in-vehicle equipment 200 obtains a distance measurement value (step S118). For example, the in-vehicle equipment 200 measures the distance between the portable device 100 and the in-vehicle equipment 200 based on a propagation time of the UWB signal transmitted and received in step S116. Subsequently, the in-vehicle equipment 200 performs authentication based on the obtained distance measurement value.

Figure 3:
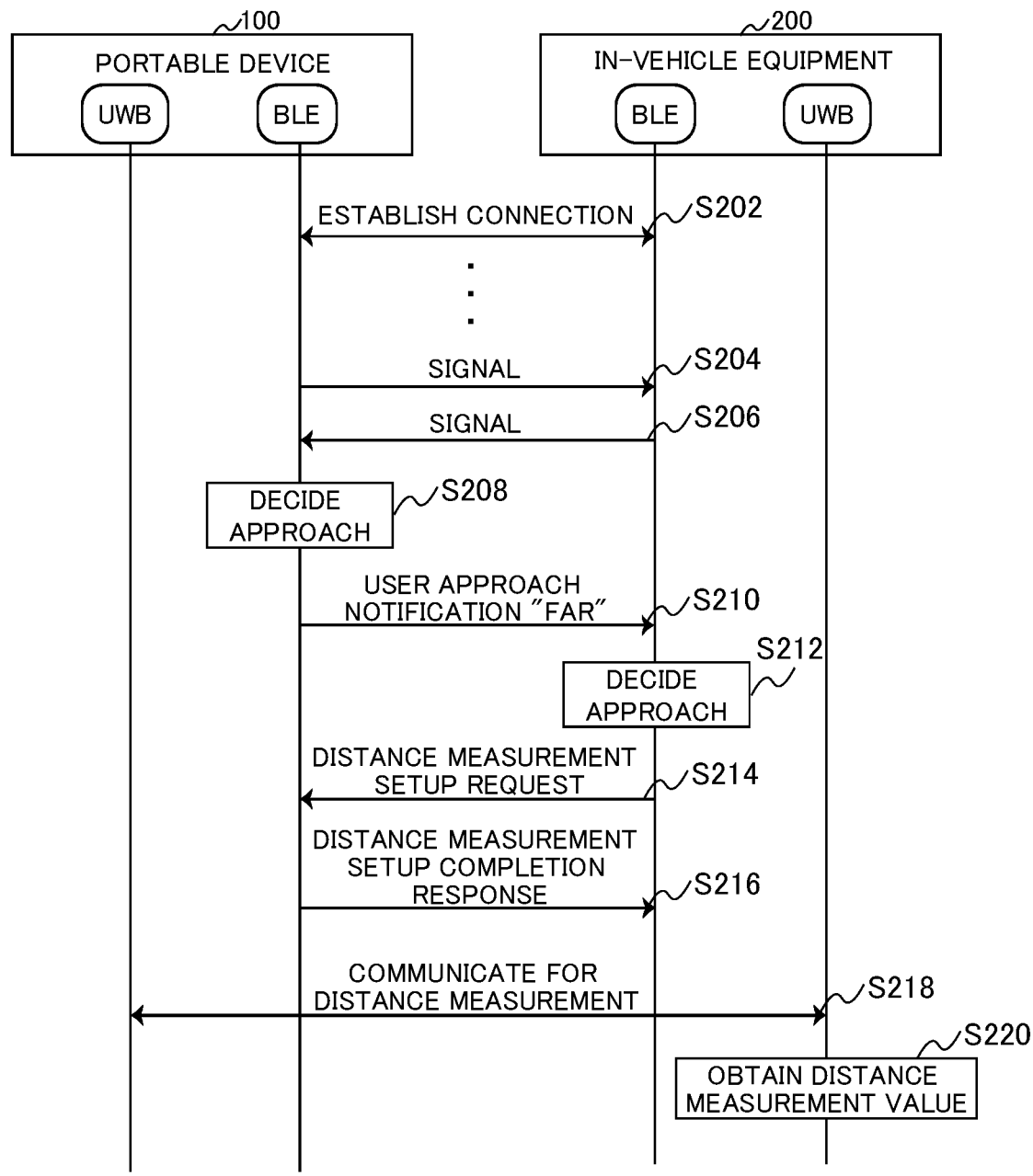
FIG. 3 is a sequence diagram illustrating an example of a flow of a process executed by the system according to the present embodiment.

FIG. 3 is a sequence diagram illustrating an example of the flow of the process executed by the system 1 according to the present embodiment. The portable device 100 and the in-vehicle equipment 200 are involved in this sequence. This sequence is an example where the subject that has decided that the approach decision conditions have been satisfied is the in-vehicle equipment 200.

Processes in steps S202 to S208 illustrated in FIG. 3 are the same as the processes in steps S102 to S108 described above with reference to FIG. 2. In this regard, it is assumed that it is decided in step S208 that a reception intensity of a BLE signal is less than the predetermined threshold, that is, the approach decision conditions are not satisfied.

Next, the portable device 100 transmits the user approach notification "far" that indicates an approach decision result as information indicating that it has been decided that the approach decision conditions have not been satisfied (step S210).

When receiving the user approach notification "far", the in-vehicle equipment 200 performs approach decision (step S212). More specifically, the in-vehicle equipment 200 decides whether or not the reception intensity exceeds the predetermined threshold, that is, whether or not the approach decision conditions are satisfied based on the user approach notification "far" that is the BLE signal. It is assumed herein that the reception intensity of the BLE signal exceeds the predetermined threshold, that is, the approach decision conditions are satisfied.

Hence, the in-vehicle equipment 200 transmits the distance measurement setup request as the information for requesting starting wireless communication that uses the UWB for measuring the distance between the portable device 100 and the in-vehicle equipment 200 (step S214).

Subsequently, processes similar to the processes in steps S114 to S118 described above with reference to FIG. 2 are executed in steps S216 to S220.

<3. Supplementary Explanation>

Heretofore, preferred embodiments of the present invention have been described in detail with reference to the appended drawings, but the present invention is not limited thereto. It should be understood by those skilled in the art that various changes and alterations may be made without departing from the spirit and scope of the appended claims.

The above embodiment has described the example where the in-vehicle equipment 200 decides whether or not the approach decision conditions are satisfied only in the case where the portable device 100 has decided that the approach decision conditions have not been satisfied. However, the present invention is not limited to this.

In an example, the in-vehicle equipment 200 may decide whether or not the approach decision conditions are satisfied every time the in-vehicle equipment 200 receives a BLE signal. According to this configuration, it is possible to further prevent the portable device 100 from causing a decrease in responsiveness of unlocking of the door lock and starting of the engine.

In another example, when receiving a BLE signal that does not include information indicating that it has been decided that the approach decision conditions have been satisfied, the in-vehicle equipment 200 may decide whether or not the approach decision conditions are satisfied. More simply, when receiving a BLE signal other than the user approach notification "close", the in-vehicle equipment 200 may decide whether or not a reception intensity of the BLE signal satisfies the approach decision conditions. This configuration can also prevent the portable device 100 from causing a decrease in the responsiveness of unlocking of the door lock and starting of the engine.

The above embodiment has described the example where the approach decision conditions are that a reception intensity of a BLE signal exceeds the predetermined threshold. However, the present invention is not limited to this example. In another example, the approach decision conditions may be that the reception intensity of the BLE signal tends to increase. In other words, even when it is not decided that the portable device 100 and the in-vehicle equipment 200 are located at a close distance, distance measurement that uses the UWB may be performed. In this regard, when it is decided that the portable device 100 and the in-vehicle equipment 200 are located at a close distance, distance measurement that uses the UWB may be performed highly frequently compared to a case where it is decided that the portable device 100 and the in-vehicle equipment 200 are located at a far distance. When, for example, it is decided that the portable device 100 and the in-vehicle equipment 200 are located at the close distance, distance measurement that uses the UWB is performed at an interval of one second, and, when it is decided that the portable device 100 and the in-vehicle equipment 200 are located at a far distance, distance measurement that uses the UWB is performed at an interval of three seconds.

The above embodiment has described the example where the first wireless communication standards are BLE, and the second wireless communication standards are the wireless communication standards that use the UWB. However, the present invention is not limited to this example. In an example, wireless communication standards that use a signal of Ultra-High Frequency (UHF) and Low Frequency (LF) ranges may be used as the first wireless communication standards or the second wireless communication standards. In another example, wireless communication standards that use Wi-Fi (registered trademark), Near Field Communication (NFC), and infrared light may be used as the first wireless communication standards or the second wireless communication standards.

The above embodiment has described the example where the second communication device is the in-vehicle equipment 200 mounted on the vehicle 202. However, the present invention is not limited to this example. In an example, the second communication device may be arranged in a parking lot, and remotely control the operation of the vehicle 202. In another example, the second communication device may be mounted on arbitrary movable bodies such as airplanes and ships other than the vehicle 202. In this regard, the movable bodies are devices that move. Naturally, the second communication device may be mounted on devices such as houses, delivery boxes, and household electrical appliances other than the movable bodies.

Note that, a series of processes performed by the devices described in this specification may be achieved by any of software, hardware, and a combination of software and hardware. A program that configures software is stored in advance in, for example, a recording medium (non-transitory medium) installed inside or outside the devices. In addition, for example, when a computer executes the programs, the programs are read into random access memory (RAM), and executed by a processor such as a CPU. The recording medium may be a magnetic disk, an optical disc, a magneto-optical disc, flash memory, or the like. Alternatively, the above-described computer program may be distributed via a network without using the recording medium, for example.

Further, in the present specification, the processes described using the flowcharts and the sequence diagrams are not necessarily executed in the order illustrated in the drawings. Some processing steps may be executed in parallel. In addition, additional processing steps may be employed and some processing steps may be omitted.

What is claimed is:

1. A system comprising:
a first communication device configured to perform wireless communication that conforms to first wireless communication standards, and wireless communication that conforms to second wireless communication standards different from the first wireless communication standards; and
a second communication device configured to perform wireless communication that conforms to the first wireless communication standards, and wireless communication that conforms to the second wireless communication standards,
wherein the first communication device and the second communication device perform the wireless communication that conforms to the first wireless communication standards, and, only when one of the first communication device and the second communication device decides that information obtained by the wireless communication that conforms to the first wireless communication standards satisfies a predetermined condition, perform the wireless communication that conforms to the second wireless communication standards for measuring a distance between the first communication device and the second communication device, and
wherein, when deciding that the information obtained by the wireless communication that conforms to the first wireless communication standards satisfies the predetermined condition, the second communication device transmits, to the first communication device by wireless communication that conforms to the first wireless communication standards, information for requesting starting the wireless communication that conforms to the second wireless communication standards for measuring the distance between the first wireless communication device and the second wireless communication device.

2. The system according to claim 1,
wherein, when receiving information indicating that the first communication device has decided that the information obtained by the wireless communication that conforms to the first wireless communication standards has not satisfied the predetermined condition, the second communication device decides whether or not the information obtained by the wireless communication that conforms to the first wireless communication standards satisfies the predetermined condition.

3. The system according to claim 1, wherein
when deciding that the information obtained by the wireless communication that conforms to the first wireless communication standards satisfies the predetermined condition, the first communication device transmits information indicating that it has been decided that the predetermined condition has been satisfied, and,
when receiving the information indicating that it has been decided that the predetermined condition has been satisfied, the second communication device transmits information for requesting starting the wireless communication that conforms to the second wireless communication standards for measuring the distance between the first communication device and the second communication device.

4. The system according to claim 1,
wherein, when receiving the information for requesting starting the wireless communication that conforms to the second wireless communication standards for measuring the distance between the first wireless communication device and the second wireless communication device, the first communication device transmits information indicating that the wireless communication that conforms to the second wireless communication standards for measuring the distance between the first wireless communication device and the second wireless communication device is started, and starts the wireless communication that conforms to the second wireless communication standards.

5. The system according to claim 4,
wherein, when receiving the information indicating that the wireless communication that conforms to the second wireless communication standards for measuring the distance between the first wireless communication device and the second wireless communication device is started, the second communication device starts the wireless communication that conforms to the second wireless communication standards.

6. The system according to claim 1,
wherein, when a reception intensity at a time when a signal is received exceeds a predetermined threshold, one of the first communication device and the second communication device decides that the information obtained by the wireless communication that conforms to the first wireless communication standards satisfies the predetermined condition, the signal being transmitted by other one of the first communication device and the second communication device and conforming to the first wireless communication standards.

7. The system according to claim 1, wherein
the first wireless communication standards are near field wireless communication standards, and
when being located within a range of a distance where the wireless communication that conforms to the first wireless communication standards can be performed, the first communication device and the second communication device perform the wireless communication that conforms to the first wireless communication standards.

8. The system according to claim 7,
wherein the first wireless communication standards are Bluetooth Low Energy (BLE (registered trademark)).

9. The system according to claim 1,
wherein the second wireless communication standards are wireless communication standards for transmitting and receiving a signal that uses an Ultra-Wide Band (UWB).

10. The system according to claim 1,
wherein the second communication device controls an operation of a vehicle based on information obtained by the wireless communication that conforms to the second wireless communication standards.

11. A communication device comprising:
a first wireless communication interface configured to perform wireless communication that conforms to first wireless communication standards;
a second wireless communication interface configured to perform wireless communication that conforms to second wireless communication standards different from the first wireless communication standards; and
a control circuit configured to control operations of the first wireless communication interface and the second wireless communication interface,
wherein the control circuit
controls the first wireless communication interface to perform the wireless communication that conforms to the first wireless communication standards with another communication interface, and
only when deciding that information obtained by the wireless communication that is performed by the first wireless communication interface and conforms to the first wireless communication standards satisfies a predetermined condition, or when the first wireless communication interface receives information indicating that it has been decided that the predetermined condition has been satisfied, controls the second wireless communication interface to perform the wireless communication with the another communication interface, the wireless communication conforming to the second wireless communication standards for measuring a distance between the second communication interface and the another communication interface,
wherein, when deciding that the information obtained by the wireless communication that conforms to the first wireless communication standards satisfies the predetermined condition, the first communication interface transmits, to the another communication interface by wireless communication that conforms to the first wireless communication standards, information for requesting starting the wireless communication that conforms to the second wireless communication standards for measuring the distance between the second communication interface and the another communication interface.

12. A communication device comprising:
a first wireless communication interface configured to perform wireless communication that conforms to first wireless communication standards;
a second wireless communication interface configured to perform wireless communication that conforms to second wireless communication standards different from the first wireless communication standards; and
a control circuit configured to control operations of the first wireless communication interface and the second wireless communication interface,
wherein the control circuit
controls the first wireless communication interface to perform the wireless communication that conforms to the first wireless communication standards with another communication interface, and
only when deciding that information obtained by the wireless communication that is performed by the first wireless communication interface and conforms to the first wireless communication standards satisfies a predetermined condition, or when the first wireless communication interface receives information for requesting starting the wireless communication that conforms to the second wireless communication standards for measuring a distance between the second communication interface and the another communication interface, controls the second wireless communication interface to perform the wireless communication with the another communication interface, the wireless communication conforming to the second wireless communication standards for measuring a distance between the second communication interface and the another communication interface,
wherein, when deciding that the information obtained by the wireless communication that conforms to the first wireless communication standards satisfies the predetermined condition, the another communication interface transmits, to the first communication interface by wireless communication that conforms to the first wireless communication standards, information for requesting starting the wireless communication that conforms to the second wireless communication standards for measuring the distance between the second communication interface and the another communication interface.

* * * * *